United States Patent
Ramamurthi et al.

(10) Patent No.: US 9,807,592 B2
(45) Date of Patent: Oct. 31, 2017

(54) CONTEXT-AWARE RESOURCE MANAGEMENT FOR VIDEO STREAMING SERVICES

(71) Applicant: Intel Corporation, Santa Clara, CA (US)

(72) Inventors: Vishwanath Ramamurthi, Sunnyvale, CA (US); Hassnaa Moustafa, Portland, OR (US); Jeffery R. Foerster, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 14/540,312

(22) Filed: Nov. 13, 2014

(65) Prior Publication Data

US 2016/0142902 A1    May 19, 2016

(51) Int. Cl.
*H04W 24/00* (2009.01)
*H04W 8/18* (2009.01)
(Continued)

(52) U.S. Cl.
CPC ............ *H04W 8/18* (2013.01); *H04L 65/607* (2013.01); *H04L 67/02* (2013.01); *H04L 69/323* (2013.01);
(Continued)

(58) Field of Classification Search
CPC ........ H04W 8/18; H04W 40/12; H04L 65/607
See application file for complete search history.

(56) References Cited

U.S. PATENT DOCUMENTS

2009/0049485 A1\* 2/2009 Agrawal ................ H04N 7/108
725/87
2012/0036541 A1 2/2012 Kotecha et al.
(Continued)

FOREIGN PATENT DOCUMENTS

WO   WO-2016076988 A1   5/2016

OTHER PUBLICATIONS

"International Application Serial No. PCT/US2015/054853, International Search Report dated Feb. 24, 2016", 3 pgs.
(Continued)

*Primary Examiner* — Wei Zhao
(74) *Attorney, Agent, or Firm* — Schwegman Lundberg & Woessner, P.A.

(57) ABSTRACT

The increasing amount of internet traffic from video streaming services, in addition to users requesting more personalized content and creating/sharing video content, has led to a huge demand for highly scalable and efficient distribution of video content, especially with mobile computing devices. Embodiments provide a network and service infrastructure better suited to these video content distribution and mobility needs. More intelligence is provided in the network infrastructure through an awareness of the user status/activity, end-user device, and content characteristics in correlation with the network bandwidth conditions. In this view of adding more intelligence in the network, additional communication is utilized between the service platform and the network to identify content characteristics (e.g., video content, content encoding characteristics), network characteristics, and device characteristics.

29 Claims, 8 Drawing Sheets

(51) Int. Cl.
  *H04L 29/06* (2006.01)
  *H04L 29/08* (2006.01)
  *H04W 40/12* (2009.01)
  *H04W 28/02* (2009.01)
  *H04N 1/00* (2006.01)
  *H04W 80/00* (2009.01)
  *H04W 28/08* (2009.01)
  *H04W 72/04* (2009.01)
  *H04W 72/12* (2009.01)
  *H04W 8/22* (2009.01)

(52) U.S. Cl.
  CPC .......... *H04N 1/00* (2013.01); *H04W 28/0268* (2013.01); *H04W 40/12* (2013.01); *H04W 80/00* (2013.01); *H04W 8/22* (2013.01); *H04W 28/08* (2013.01); *H04W 72/0453* (2013.01); *H04W 72/12* (2013.01)

(56) References Cited

U.S. PATENT DOCUMENTS

| | | |
|---|---|---|
| 2012/0054809 A1 | 3/2012 | Chowdhury et al. |
| 2013/0074120 A1 | 3/2013 | Adimatyam et al. |
| 2013/0144979 A1 | 6/2013 | Kansal et al. |
| 2013/0223240 A1* | 8/2013 | Hayes ............... H04W 28/0231 370/252 |
| 2013/0290493 A1* | 10/2013 | Oyman ................ H04L 65/608 709/219 |
| 2014/0222572 A1* | 8/2014 | Ryu .................. G06Q 30/0261 705/14.58 |
| 2014/0223472 A1 | 8/2014 | Sarda et al. |

OTHER PUBLICATIONS

"International Application Serial No. PCT/US2015/054853, Written Opinion dated Feb. 24, 2016", 6 pgs.

* cited by examiner

500

| QCI | Resource Type | Priority | Packet Delay Budget | Packet Error Loss Rate | Example Services |
|---|---|---|---|---|---|
| 1 | GBR | 2 | 100 ms | $10^{-2}$ | Conversational Voice |
| 2 | | 4 | 150 ms | $10^{-3}$ | Conversational Video (Live Streaming) |
| 3 | | 3 | 50 ms | $10^{-3}$ | Real Time Gaming |
| 4 | | 5 | 300 ms | $10^{-6}$ | Non-Conversational Video (Buffered Streaming) |
| 5 | non-GBR | 1 | 100 ms | $10^{-6}$ | IMS Signalling |
| 6 | | 6 | 300 ms | $10^{-6}$ | Video (Buffered Streaming) TCP-based (e.g., www, e-mail, chat, ftp, p2p file sharing, progressive video, etc.) |
| 7 | | 7 | 100 ms | $10^{-3}$ | Voice, Video (Live Streaming) Interactive Gaming |
| 8 | | 8 | 300 ms | $10^{-6}$ | Video (Buffered Streaming) TCP-based (e.g., www, e-mail, chat, ftp, p2p file sharing, progressive video, etc.) |
| 9 | | 9 | | | |

FIG. 5

CONTEXT-AWARE RESOURCE MANAGEMENT FOR VIDEO STREAMING SERVICES

TECHNICAL FIELD

Embodiments pertain to wireless communications. Some embodiments relate to resource management for video streaming services over wireless or cellular networks.

BACKGROUND

A mobile computing device can exchange voice, data and other signals or information with other devices through communication sessions that involve network components, such as base stations. A mobile computing device operating in a cellular network can experience degradation in performance or user experience when the network becomes highly loaded with devices or traffic. A highly contributing source of network traffic is from video streaming services which are in continuous expansion. Improving the distribution video content would help reduce network degradation currently associated with high demand for video content and enhances user's experience for video services.

BRIEF DESCRIPTION OF THE DRAWINGS

FIG. 5 illustrates an example table of Quality of Service (QoS) parameters in accordance with some embodiments.

DETAILED DESCRIPTION

The following description and the drawings sufficiently illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

In some embodiments, mobile devices or other devices described herein can be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that can receive and/or transmit information wirelessly. In some embodiments, the mobile device or other device can be a User Equipment (UE) or an Evolved Node-B (eNodeB) configured to operate in accordance with 3GPP standards. In some embodiments, the mobile device or other device can be configured to operate according to other protocols or standards, including IEEE 802.11 or other IEEE and 3GPP standards. In some embodiments, the mobile device or other device can include one or more of a keyboard, a display, a non-volatile memory port, multiple antennas, a graphics processor, an application processor, speakers, and other mobile device elements. The display can be an LCD screen including a touch screen.

Figure 1:
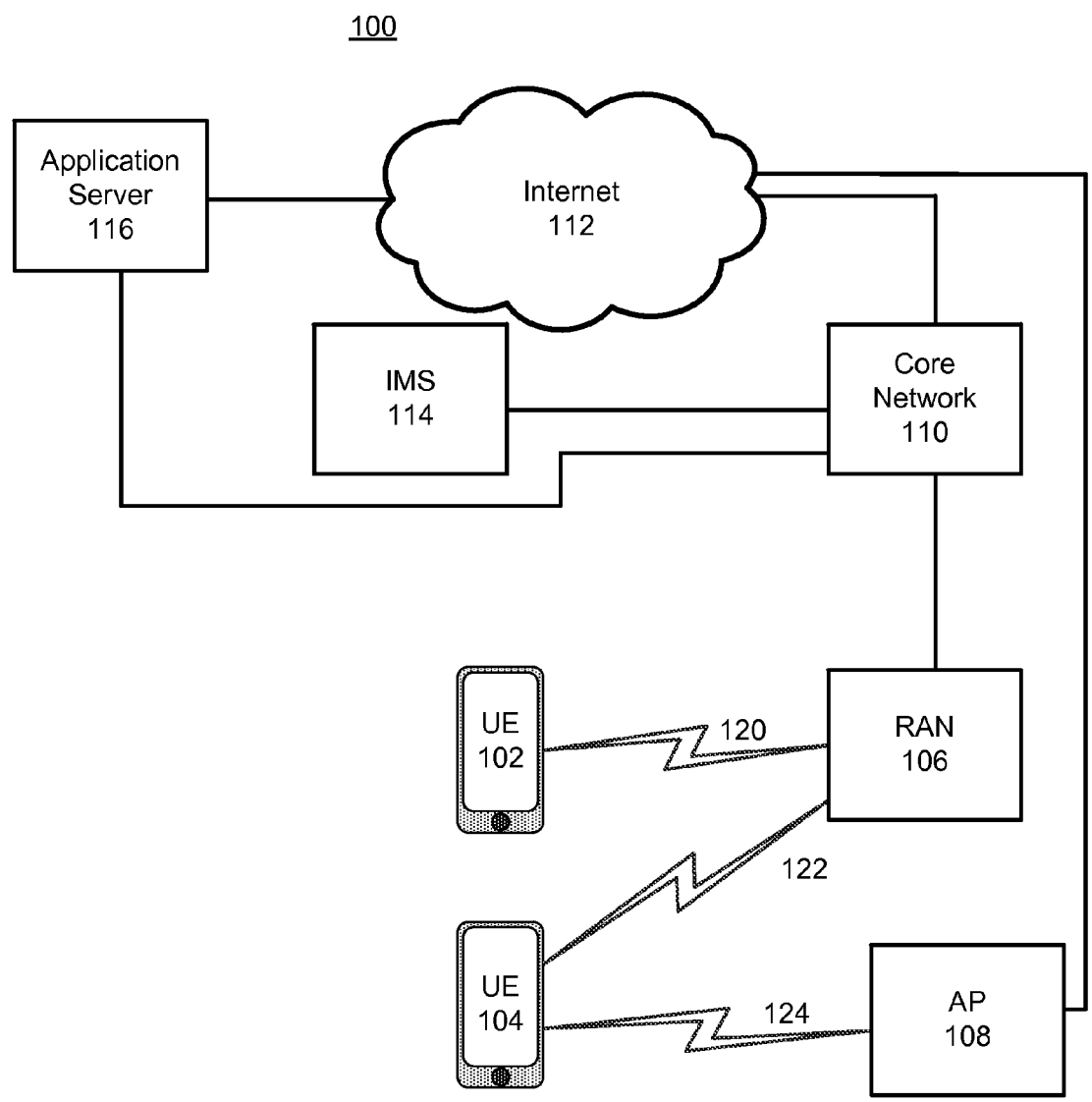
FIG. 1 illustrates an architecture of a wireless network with various components of the network in accordance with some embodiments.

FIG. 1 illustrates an architecture of a wireless network with various components of the network in accordance with some embodiments. A system 100 is shown to include a user equipment (UE) 102 and a UE 104. The UEs 102 and 104 are illustrated as smartphones (i.e., handheld touchscreen mobile computing devices connectable to one or more cellular networks), but can also include personal digital assistant (PDAs), pagers, laptop computers, desktop computers, etc.

The UEs 102 and 104 are configured to access a radio access network (RAN) 106 via connections 120 and 122, respectively, each of which comprise a physical communications interface or layer; in this embodiment, the connections 120 and 122 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, etc.

The RAN 106 can include one or more access points that enable the connections 120 and 122. These access points (described in further detail below) can be referred to as access nodes, base stations (BSs), NodeBs, enhanced NodeBs (eNodeBs), etc., and can comprise ground stations (i.e., terrestrial access points) or satellite access points. The RAN 106 is shown to be communicatively coupled to a core network 110 (described in further detail below). The core network 110 can be used to enable a packet-switched (PS) data exchange with the internet 112 in addition to bridging circuit switched (CS) calls between the UEs 102 and 104.

The UE 104 is shown to be configured to access an access point (AP) 108 via connection 124. The connection 124 can comprise a local wireless connection of a wireless local area network (WLAN), such as a connection consistent with IEEE 802.11, wherein the AP 108 would comprise a wireless fidelity (WiFi) router. In this example, the AP 108 is shown to be connected to the internet 112 without connecting to the core network 110.

The internet 112 is shown to be communicatively coupled to an application server 116. The application server 116 can be implemented as a plurality of structurally separate servers, or can be included in a single server. The application server 116 can include video content to be distributed via one or more video streaming services, as discussed in further detail below.

The application server 116 is shown as connected to both the internet 112 and the core network 110; in other embodiments, the core network 110 connects to the application server 116 via the internet 112. The application server 116 can be implemented as a plurality of structurally separate servers, or alternately can correspond to a single server. The application server 116 can also be configured to support one or more communication services (e.g., Voice-over-Internet Protocol (VoIP) sessions, Push-to-Talk (PTT) sessions, group communication sessions, social networking services, etc.) for UEs that can connect to the application server 116 via the core network 110 and/or the internet 112.

The core network 110 is further shown to be communicatively coupled to Internet Protocol (IP) Multimedia Subsystem (IMS) 114. The IMS 114 comprises an integrated network of telecommunications carriers that can enable the use of IP for packet communications, such as traditional telephony, fax, e-mail, internet access, Voice over IP (VoIP), instant messaging (IM), videoconference sessions and video on demand (VoD), etc.

Figure 2:
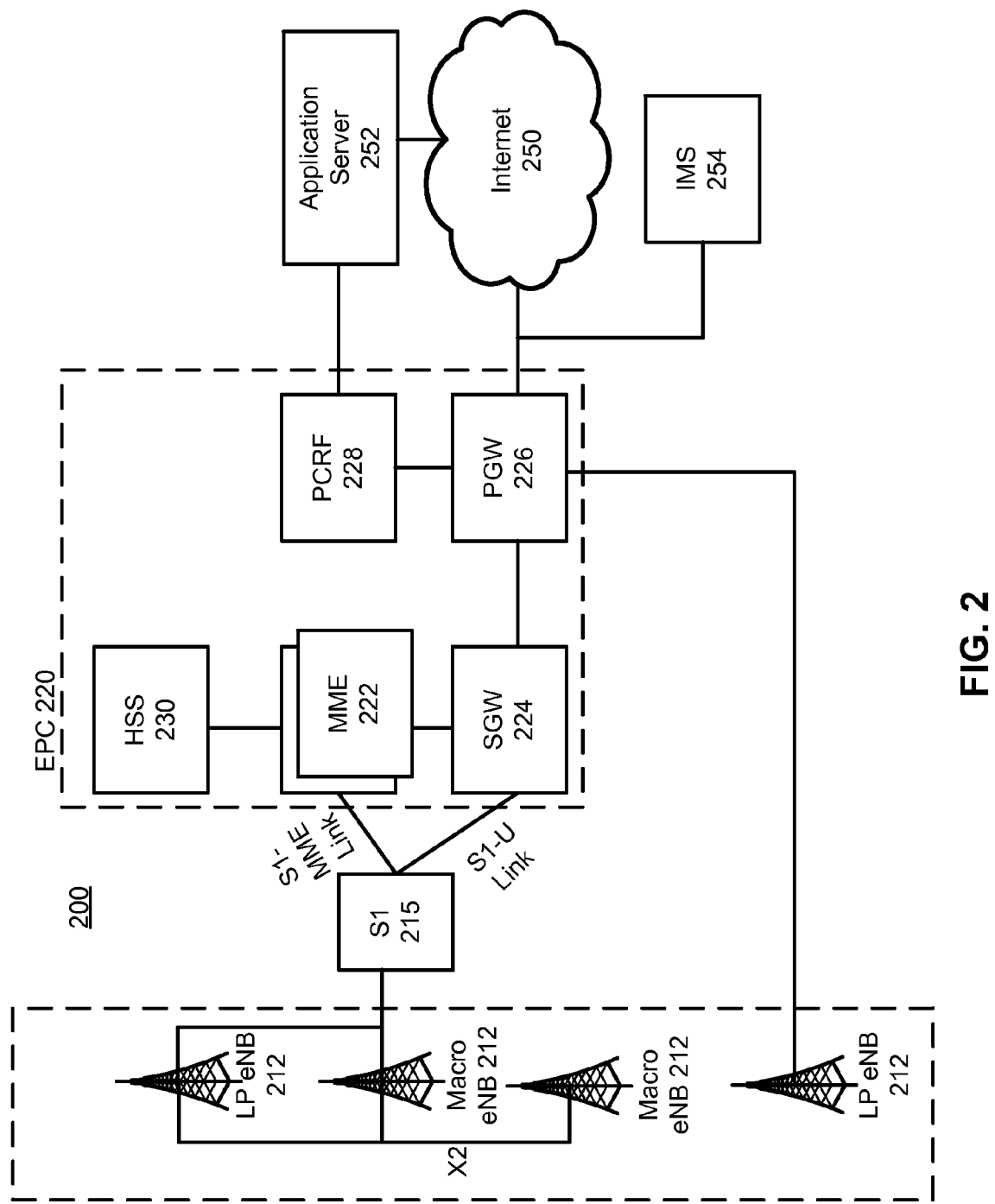
FIG. 2 illustrates an architecture of components of a Long Term Evolution (LTE) network in accordance with some embodiments.

FIG. 2 illustrates an architecture of components of an LTE network in accordance with some embodiments. In this embodiment, (sub)system 200 comprises an Evolved Packet System (EPS) on an LTE network, and thus includes an Evolved Universal Mobile Telecommunications System (UMTS) Terrestrial RAN (E-UTRAN) 210 and an Evolved Packet Core (EPC) network 220 communicatively coupled via an S1 interface 215. In this illustration, only a portion of the E-UTRAN 210, as well as the EPC network 220, is shown. Some of the elements described below may be referred to as "modules" or "logic." As referred to herein, "modules" or "logic" may describe hardware (such as a circuit), software (such as a program driver) or a combination thereof (such as a programmed micro-processing unit).

The E-UTRAN 210 includes eNodeBs 212 (which can operate as base stations) for communicating with one or more UEs. The eNodeBs 212 are shown in this embodiment to include macro eNodeBs and low power (LP) eNodeBs. The eNodeBs 212 can terminate the air interface protocol and can be the first point of contact for a UE. In some embodiments, any of the eNodeBs 212 can fulfill various logical functions for the E-UTRAN 210 including but not limited to radio network controller (RNC) functions such as radio bearer management, uplink and downlink dynamic radio resource management and data packet scheduling, and mobility management. eNodeBs in EPS/LTE networks, such as the eNodeBs 212, do not utilize a separate controller (i.e., an RNC) to communicate with the EPC network 220; in other embodiments utilizing other specification protocols, RANs can include an RNC to enable communication between BS s and core networks.

In accordance with embodiments, UEs can be configured to communicate Orthogonal Frequency-Division Multiplexing (OFDM) communication signals with any of the eNodeBs 212 over a multicarrier communication channel in accordance with an Orthogonal Frequency-Division Multiple Access (OFDMA) communication technique for downlink communications, and a Single Carrier Frequency Division Multiple Access (SC-FDMA) communication technique for uplink communications. The OFDM signals can comprise a plurality of orthogonal subcarriers.

In accordance with some embodiments, UEs can be configured to determine a synchronization reference time based on reception of one or more signals from any of the eNodeBs 212. A UE can also be configured to support device-to-device (D2D) communication with other UEs using OFDMA, SC-FDMA or other multiple access schemes.

The S1 interface 215 is the interface that separates the E-UTRAN 210 and the EPC network 220. It is split into two parts: the S1-U, which carries traffic data between the eNodeBs 212 and the serving gateway (SGW) 224, and the S1-MME, which is a signaling interface between the eNodeBs 212 and the mobility management entities (MMEs) 222. The X2 interface is the interface between eNodeBs 212. The X2 interface can comprises two parts (not shown), the X2-C and X2-U. The X2-C is the control plane interface between the eNodeBs 212, while the X2-U is the user plane interface between the eNodeBs 212.

With cellular networks, low power cells can be used to extend coverage to indoor areas where outdoor signals do not reach well, or to add network capacity in areas with very dense phone usage, such as train stations. As used herein, the term "low power (LP) eNodeB" refers to any suitable relatively low power eNodeB for implementing a narrower cell (i.e., narrower than a macro cell) such as a femtocell, a picocell, or a micro cell at the edge of the network. Femtocell eNodeBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNodeB might be a femtocell eNodeB since it is coupled through the PGW 226. Similarly, a picocell is a wireless communication system typically covering a small area, such as in-building (offices, shopping malls, train stations, etc.), or more recently in-aircraft. A picocell eNodeB can generally connect through the X2 link to another eNodeB such as a macro eNodeB through its base station controller (BSC) functionality. Thus, LP eNodeB can be implemented with a picocell eNodeB since it is coupled to a macro eNodeB via an X2 interface. Picocell eNodeBs or other LP eNodeBs can incorporate some or all functionality of a macro eNodeB. In some cases, this can be referred to as an access point base station or enterprise femtocell.

In some embodiments, a downlink resource grid can be used for downlink transmissions from any of the eNodeBs 212 to a UE while uplink transmission from the UE to any of the eNodeBs 212 can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this represents the smallest quanta of resources that currently can be allocated. There are several different physical downlink channels that are conveyed using such resource blocks.

The physical downlink shared channel (PDSCH) carries user data and higher-layer signaling to a UE. The physical downlink control channel (PDCCH) carries information about the transport format and resource allocations related to the PDSCH channel, among other things. It also informs the UE about the transport format, resource allocation, and H-ARQ (Hybrid Automatic Repeat Request) information related to the uplink shared channel. Typically, downlink scheduling (assigning control and shared channel resource blocks to UEs 102 within a cell) is performed at any of the eNodeBs 212 based on channel quality information fed back from the UEs to any of the eNodeBs 212, and then the downlink resource assignment information is sent to a UE on the control channel (PDCCH) used for (assigned to) the UE.

The PDCCH uses control channel elements (CCEs) to convey the control information. Before being mapped to resource elements, the PDCCH complex-valued symbols are first organized into quadruplets, which are then permuted using a sub-block inter-leaver for rate matching. Each PDCCH is transmitted using one or more of these CCEs, where each CCE corresponds to nine sets of four physical resource elements known as resource element groups (REGs). Four Quadrature Phase Shift Keying QPSK symbols are mapped to each REG. The PDCCH can be transmitted using one or more CCEs, depending on the size of DCI and the channel condition. There can be four or more different PDCCH formats defined in LTE with different numbers of CCEs (e.g., aggregation level, L=1, 2, 4, or 8).

The EPC network 220 includes the MMEs 222, the SGW 224, a packet data network gateway (PGW) 226, a Policy and Charging Rules Function (PCRF) 228, and a Home Subscriber Server (HSS) 230.

The MMEs 222 are similar in function to the control plane of legacy Serving General packet radio service (GPRS) Support Nodes (SGSN). The MMEs 222 manage mobility aspects in access such as gateway selection and tracking area list management. The SGW 224 terminates the interface toward the E-UTRAN 210, and routes data packets between the E-UTRAN 210 and the EPC network 220. In addition, it can be a local mobility anchor point for inter-eNodeB handovers and also can provide an anchor for inter-3GPP mobility. Other responsibilities can include lawful intercept, charging, and some policy enforcement.

The SGW 224 and the MMEs 222 can be implemented in one physical node or separate physical nodes. The PGW 226 terminates an SGi interface toward the packet data network (PDN). The PGW 226 routes data packets between the EPC network 220 and external networks such as internet 250 and IMS 254, and can be a key node for policy enforcement and charging data collection. The PGW 226 and SGW 224 can be implemented in one physical node or separated physical nodes.

The PCRF 228 is the policy and charging control element of the EPC network 220. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN).

The application server 252 (alternatively referred to as application function (AF)) is shown as connected to the EPC network 220 via the internet 250, or alternatively to the PCRF 228 directly via an Rx interface. Generally, the application server 252 is an element offering applications that use IP bearer resources with the core network (e.g., UMTS PS domain, LTE PS data services, etc.). The application server 252 can signal the PCRF 228 to indicate a new service flow and selecting the appropriate Quality of Service (QoS) and charging parameters. The PCRF 228 provisions this rule into a Policy and Charging Enforcement Function (PCEF) (not shown) with the appropriate traffic flow template (TFT) and QoS class of identifier (QCI), which commences the QoS and charging as specified by the application server 252.

Figure 3:
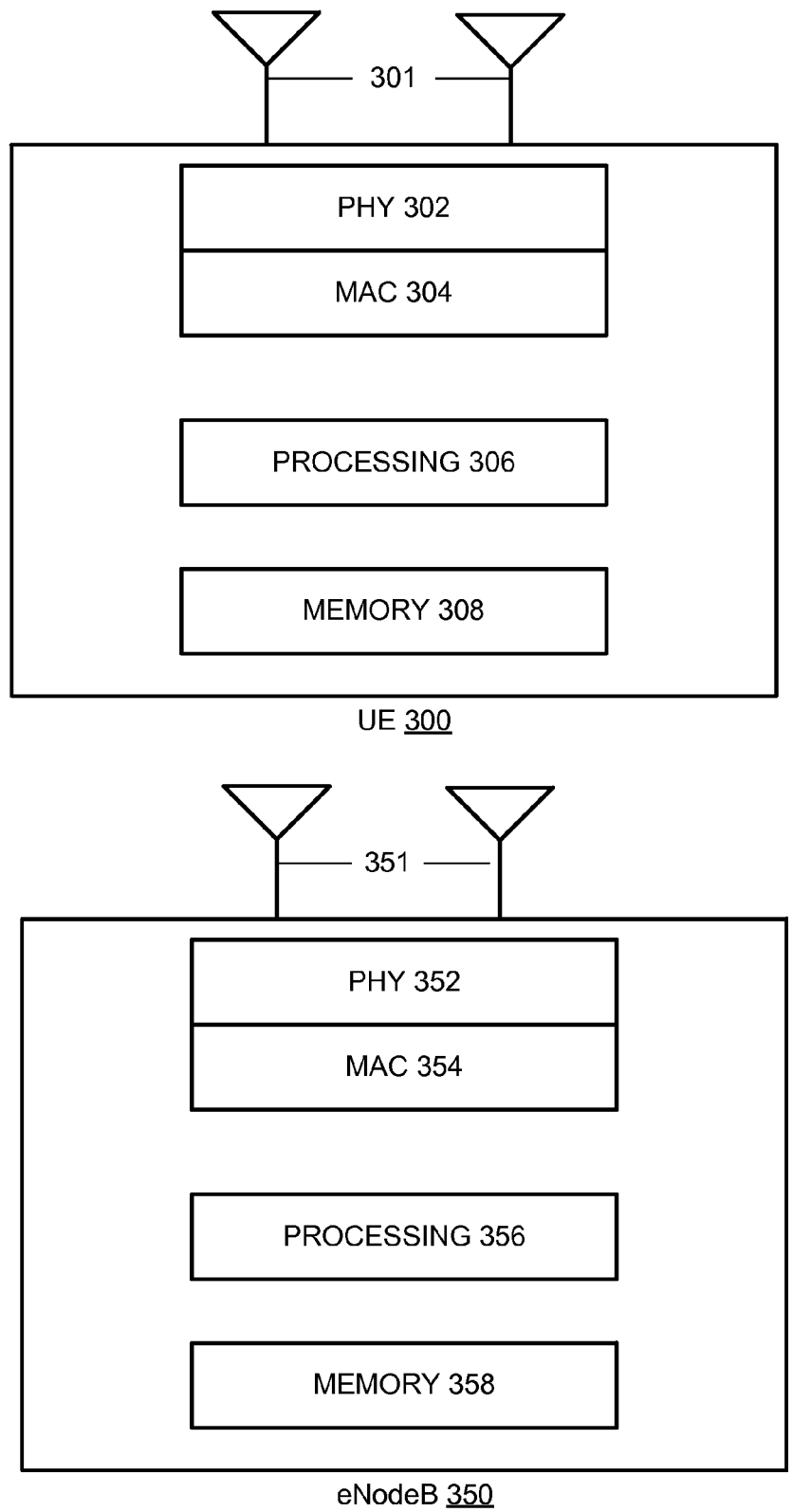
FIG. 3 shows a block diagram of a user equipment (UE) and an enhanced NodeB (eNodeB) in accordance with some embodiments.

FIG. 3 shows a block diagram of a UE 300 and an eNodeB 350 in accordance with some embodiments. It should be noted that in some embodiments, the eNodeB 350 can be a stationary non-mobile device. The UE 300 can include physical layer circuitry 302 for transmitting and receiving signals to and from the eNodeB 350, other eNodeBs, other UEs, or other devices using one or more antennas 301, while the eNodeB 350 can include physical layer circuitry 352 for transmitting and receiving signals to and from the UE 300, other eNodeBs, other UEs, or other devices using one or more antennas 351. The UE 300 can also include medium access control layer (MAC) circuitry 304 for controlling access to the wireless medium, while the eNodeB 350 can also include MAC circuitry 354 for controlling access to the wireless medium. The UE 300 can also include processing circuitry 306 and memory 308 arranged to perform the operations described herein, and the eNodeB 350 can also include processing circuitry 356 and memory 358 arranged to perform the operations described herein.

The antennas 301, 351 can comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351 can be effectively separated to benefit from spatial diversity and the different channel characteristics that can result.

Although the UE 300 and eNodeB 350 are each illustrated as having several separate functional elements, one or more of the functional elements can be combined and can be implemented by combinations of software-configured elements, such as processing elements including digital signal processors (DSPs), and/or other hardware elements. For example, some elements can comprise one or more microprocessors, DSPs, field-programmable gate arrays (FPGAs), application specific integrated circuits (ASICs), radio-frequency integrated circuits (RFICs) and combinations of various hardware and circuitry for performing at least the functions described herein. In some embodiments, the functional elements can refer to one or more processes operating on one or more processing elements.

Embodiments can be implemented in one or a combination of hardware, firmware and software. Embodiments can also be implemented as instructions stored on a computer-readable storage device, which can be read and executed by at least one processor to perform the operations described herein. A computer-readable storage device can include any non-transitory mechanism for storing information in a form readable by a machine (e.g., a computer). For example, a computer-readable storage device can include read-only memory (ROM), random-access memory (RAM), magnetic disk storage media, optical storage media, flash-memory devices, and other storage devices and media. Some embodiments can include one or more processors and can be configured with instructions stored on a computer-readable storage device.

In accordance with embodiments, the UE 300 can operate in accordance with a device-to-device (D2D) communication mode. The UE 300 can include hardware processing circuitry to determine a synchronization reference time based on reception of one or more signals from the eNodeB 350. The hardware processing circuitry can be further to, during a D2D communication session, transmit Multi-Time Transmission Interval Bundle Groups (MTBG) of data symbols during a first group of Data Transmission Intervals (DTI) and refrain from transmission of data symbols during a second group of DTIs that is exclusive to the first group of DTIs. Starting times of the DTIs can be based at least partly on the synchronization reference time. The hardware processing circuitry can be further to transmit, during an in-network communication session exclusive to the D2D communication session, data symbols according to a Time Transmission Interval (TTI) reference time that is synchronized to the synchronization reference time. These embodiments are described in more detail below.

In some scenarios, the UE 300, operating in a cellular communication network, can begin to experience performance degradation for various reasons. As an example, user loading or throughput demands of the network can become high. As another example, the UE 300 can move toward or beyond the edges of coverage cells. While operating in the network, the UE 300 can actually be in communication with other UEs that are physically located in close proximity to the UE 300, although the communication can take place through the network. In addition to, or instead of, communication through the network, it can be beneficial to the UE 300 and the system for the UE 300 to engage in direct or D2D communication with one or more other UEs that can be within range of the UE 300. As an example, in the performance degradation scenarios described above, the D2D communication between the UE 300 and the other UEs can enable the network to off-load some of the network traffic, which can improve overall system performance.

Figure 4:
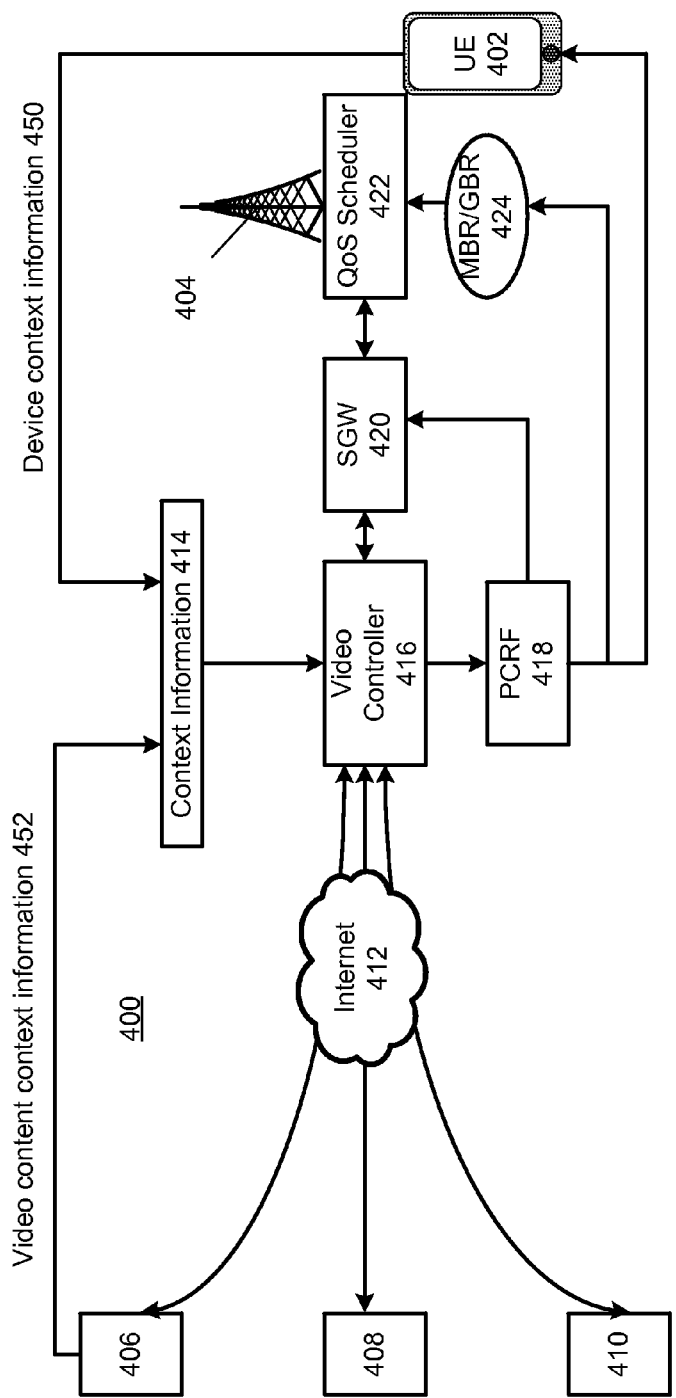
FIG. 4 illustrates wireless network components generating and processing a video content request in accordance with some embodiments.

FIG. 4 illustrates wireless network components generating and processing a video content request in accordance with some embodiments. System 400 is shown to include a UE 402, video content servers 406, 408, and 410 providing video content streams via the internet 412, a video controller 416, a PCRF 418, an SGW 420, and a QoS scheduler 422 communicatively coupled to an eNodeB 404. Although illustrated as an element separate from the eNodeB 404, the QoS scheduler 422 can be included in the eNodeB 404 in some embodiments, or any other component of a wireless network system in some embodiments.

The increasing amount of internet traffic from video streaming services, in addition to users requesting more personalized content and creating/sharing video content, has led to a huge demand for highly scalable and efficient distribution of video content, especially with mobile computing devices. As described in further detail below, system 400 provides a network and service infrastructure better suited to these video content distribution and mobility needs. More intelligence is provided in the network infrastructure through an awareness of the user status/activity, end-user device, and content characteristics in correlation with the network bandwidth conditions. In this view of adding more intelligence in the network, additional communication is utilized between the service platform and the network to identify content characteristics (e.g., video content, content encoding characteristics), network characteristics, and device characteristics.

As described below, the video controller 416, in part, provides a means for intelligent resource allocation for video streaming in system 400. The video controller 416 receives context information 414, and thus is provided "context-awareness" during the resource allocation for video flows in video streaming. Context information on the user, her device, and the requested video content is coupled with the bandwidth availability information and content characteristics information when resource allocation and video streaming encoding determinations are made for the video flows in the video streaming sessions.

System 400 utilizes the connectivity and buffer level information used in resource allocation and encoding determinations for adaptive video streaming, in addition to context information on the user, user device capabilities, and the video content characteristics in real-time during the video session. In this embodiment, video controller 416 is described below as implementing service functions for enhanced video management for each video flow (e.g., intelligent scheduling function, video optimizer function, context information analysis).

In this example, the UE 402 sends device context information 450 (shown as aggregated with video content context information 452 into the context information 414) to the video controller 416 in addition to the video content request (e.g., prior to sending the content request, concurrently, etc.). The device context information 450 can include any combination of: the user's data plan consumption preference (e.g., normal consumption, moderated consumption or constrained consumption), the user's preference to content quality, the screen size of the UE 402, the power supply level of the UE 402, and/or the current mobility level of the UE 402 (e.g., ranging from stationary or zero-mobility, to high mobility).

Furthermore, in this example, the video controller 416 receives video content context information 452 (included in context information 414) comprising context information on the content from the video servers (in this example, video server 406) during the transmission of the streamed content from the server 406 to the UE 402. For example, in embodiments utilizing Dynamic Adaptive Video Streaming over HTTP (DASH), the video segment selected from the Media Presentation Description (MPD) includes this context information. Examples of this context information can include any combination of: a quality of the video content (e.g., the video Mean Opinion Score (MOS/VMOS) of the content), the video content type (e.g. news, movie, sport events, etc.), the video content utilizations in terms of bandwidth and devices resources, and/or the video content duration.

The video controller 416 can determine the QoS parameters to define at least one of a packet delay tolerance, a packet loss rate, and/or a bit rate associated with the transmission of the video content—for example, Maximum Bit Rate (MBR) and Guaranteed Bit Rate (GBR) parameters 424 based on the received context information 414. The QoS scheduler 422 can determine QoS enforcement parameters based on the received MBR/GBR parameters 424. In some embodiments, similar QoS enforcements can be followed (e.g., at SGW 420). In other words, the video controller 416 utilizes the received context information 414 to determine the QoS parameters for each video connection in a context-aware manner. The QoS parameters can be based, at least in part, on the MBR/GBR parameters 424 assigned for each streaming user.

In some embodiments, information from the video controller 416 is communicated to both the streaming client (i.e., UE 402) as well as the various network nodes along the network path. In this example, SGW 420 and PCRF 418, which enforces QoS parameters in the system 400, receive this information. All the network nodes can use this information to enforce context-aware QoS parameters for different user data sessions.

The context information 414 can further be updated dynamically as it conditions change in an event based paradigm (e.g., change in mobility, change in requests video content, etc.). Thus, the video controller 416 can dynamically re-configure the QoS parameters of each video flow in each video streaming session based on device, network, and video content context information updated in real-time.

FIG. 5 illustrates an example table of QoS parameters in accordance with some embodiments. In this embodiment, a table 500 includes rows of QoS class identifiers (QCIs). Each QCI is scalar that can be used as a reference to node-specific parameters that control packet forwarding treatment (e.g., scheduling weights, admission thresholds, queue management thresholds, link layer protocol configuration, etc.) and that have been pre-configured by the operator owning the node (e.g., an eNodeB).

The other columns of the table 500 describe the packet forwarding treatment that a data flow can receive edge-to-edge between a UE and a PCEF in terms of the following performance characteristics: Resource Type (in this example, GBR or non-GBR), Priority, Packet Delay Budget (PDB), Packet Error Loss (PEL) Rate, and example services of each QCI. The standardized characteristics cannot be signaled on any interface, but instead can be used as guidelines for the pre-configuration of node specific parameters for each QCI.

The Resource Type, as shown in the table 500, determines if dedicated network resources related to a service or bearer level GBR value are permanently allocated (e.g., by an admission control function in a radio base station). GBR data flows are therefore typically authorized "on demand" which can utilize dynamic policy and charging control. A non-GBR data flow can be pre-authorized through static policy and charging control.

The PDB, as shown in the table 500, defines an upper bound for the time that a packet can be delayed between a UE and a PCEF. For a certain QCI, the value of the PDB can be the same in uplink and downlink. The purpose of the PDB is to support the configuration of scheduling and link layer functions.

Services using a non-GBR QCI can experience congestion-related packet drops; this can occur, for example, during traffic load peaks or when the UE becomes coverage-limited. Services using a GBR QCI can assume that congestion-related packet drops do not occur (or rarely occur).

In the table 500, each QCI (GBR and Non-GBR) is associated with a Priority level; in this example, Priority level 1 is the highest Priority level. The Priority levels can be used to differentiate between data flows of the same UE, and can also be used to differentiate between data flows of different UEs. Via its QCI, a data flow is associated with a Priority level and a PDB. Scheduling between different data flows can be based on the PDB.

The PELR defines an upper bound for the rate of Service Data Units (SDUs) (e.g., IP packets) that have been processed by the sender of a link layer protocol, but that are not successfully delivered by the corresponding receiver to an upper layer. In other words, the PELR defines an upper bound for a rate of non-congestion related packet losses.

Thus, in various embodiments, any of the above described QoS parameters can be modified for video streaming services based on device, network, or content context. In some embodiments, different video content streams can also be selected based on device, network, or content context.

Figure 6:
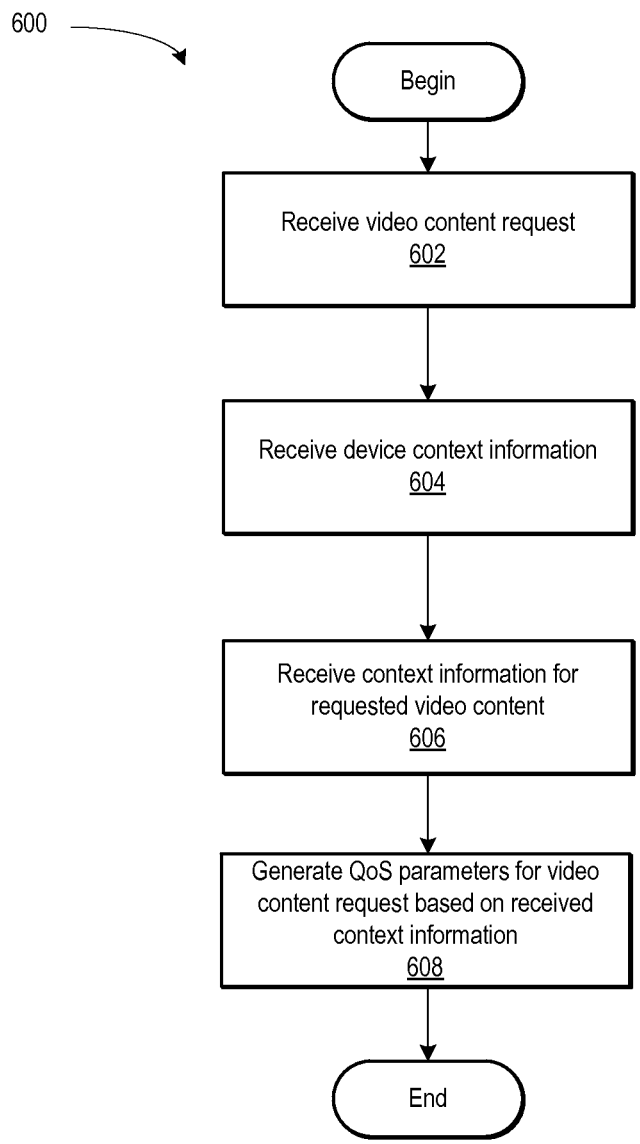
FIG. 6 illustrates a flow diagram for context-aware resource management for video streaming services is accordance with some embodiments.

FIG. 6 illustrates a flow diagram for context-aware resource management for video streaming services in accordance with some embodiments. Logical flow diagrams as illustrated herein provide examples of sequences of various process actions. Although shown in a particular sequence or order, unless otherwise specified, the order of the actions can be modified. Thus, the described and illustrated implementations should be understood only as examples, and the illustrated processes can be performed in a different order, and some actions can be performed in parallel. Additionally, one or more actions can be omitted in various embodiments; thus, not all actions are required in every implementation. Other process flows are possible.

Logic flow 600, which can be executed in a 3GPP network or a non-3GPP network (e.g., a home or enterprise WLAN, etc.) includes operations for receiving a video content request issued from a UE (block 602). The video content request can comprise a hypertext transfer protocol (HTTP) live streaming (HLS) request, an HTTP dynamic streaming (HDS) request, and/or a smooth streaming, and motion picture experts group (MPEG) dynamic adaptive streaming over HTTP (MPEG-DASH) request.

Context information of the UE issuing the request is also received (block 604). This context information can comprise mobile device hardware characteristics, including at least one of a display screen size of the mobile computing device, a display screen resolution of the mobile computing device, processor characteristics of the mobile computing device, and/or graphics processor unit (GPU) characteristics of the mobile computing device. Context information can further include activity tracking information indicating a mobility of the mobile computing device.

Context information for the requested video content is received (block 606). This context information can include video content quality level, video content type (e.g., news, movie, sporting event, etc.), bandwidth and devices resource requirements, video content duration, etc.

QoS parameters are then generated for the video content request based, at least in part, on the received context information (block 608). The QoS parameters define at least one of a packet delay tolerance, a packet loss rate, and/or a bit rate associated with the transmission of the video content request. For example, the QoS parameters can comprise at least one of a jitter value associated with the video content request, a packet dropping probability associated with the video content request, a GBR associated with the video content request, an MBR associated with the video content request, and/or a bit error rate (BER) associated with the video content request.

Figure 7:
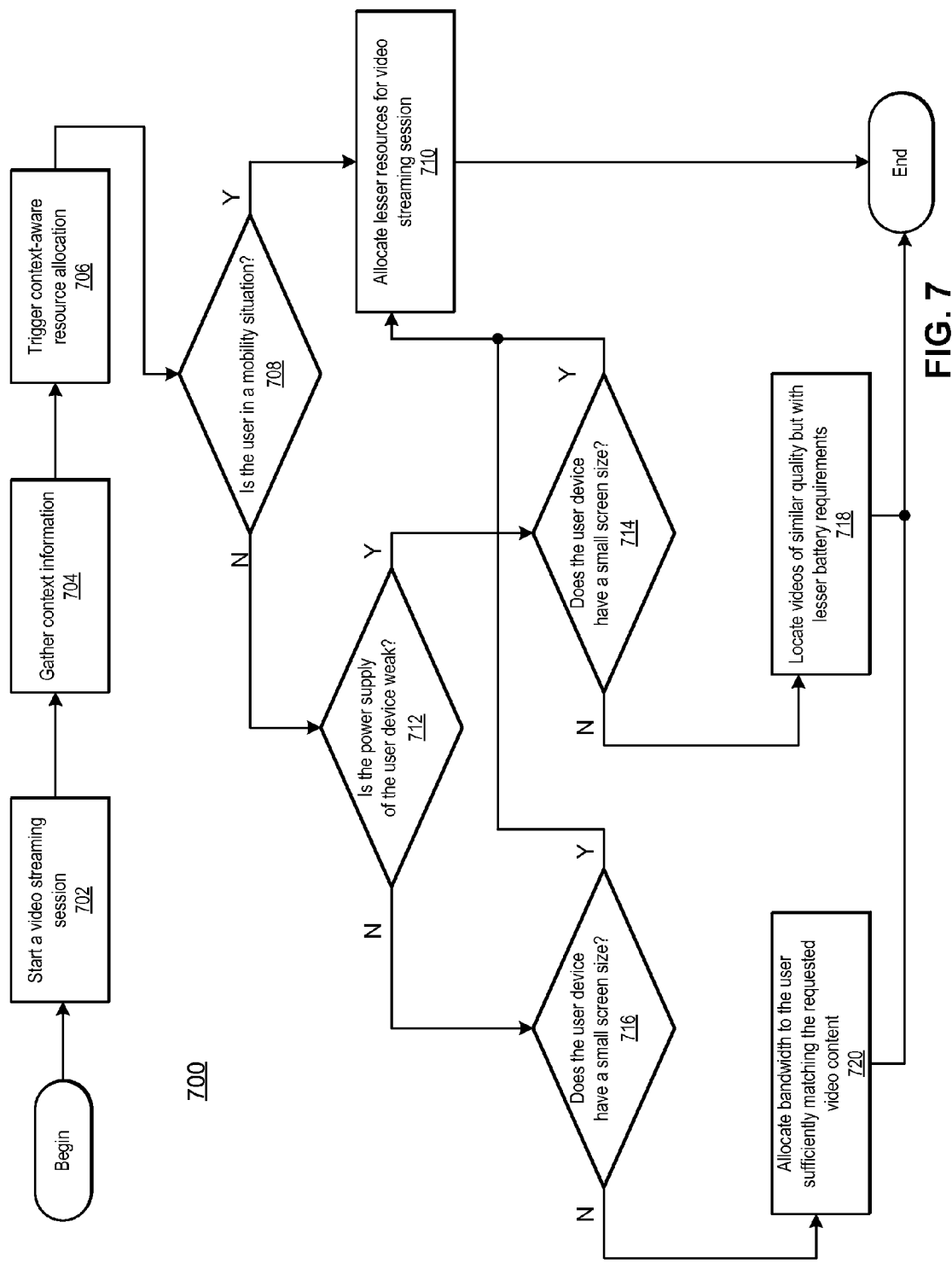
FIG. 7 illustrates a flow diagram for context-aware resource allocation for video streaming services is accordance with some embodiments.

FIG. 7 illustrates a flow diagram for context-aware resource allocation for video streaming services is accordance with some embodiments. Logic flow 700, which can be executed in a 3GPP network or a non-3GPP network (e.g., a home or enterprise WLAN, etc.), includes operations for starting a video streaming session (block 702). The video streaming session can be started in default mode (i.e., not based on device or video content context); in this embodiment, context information is gathered (block 704) and context-aware resource allocation is triggered after the video streaming session start (block 706).

Context aware resource allocation can include operations discussed above with respect to FIG. 6, wherein the user requests video segments based on the current network conditions and signals to a video-aware controller logic the user and device context information (e.g., mobility, device hardware characteristics, etc.) The server including the video content can also transmit MPD information associated with content of the requested video segments to the video-aware controller logic.

Once the above described context is received, the video-aware controller can execute any combination of determinations. In this example, operations are executed to determine if the user is in a mobility situation (block 708). A user's mobility can comprise movement within a 3GPP network, movement within a non-3GPP network, or movements between these networks (e.g., movement from a home WLAN network to a 3GPP network, or vice-versa). If the user is in a mobility situation, the scheduler can allocate lesser resources since perception quality differs with mobility (i.e., the user has a reduced perception capacity and is likely more tolerant of errors) (block 710). This in turn allows for a gain in terms of bandwidth availability by a base station. In some embodiments, the network conditions for the user can change as a result of variation of resources allocation, and this can be reflected automatically in the client's player choice for the video presentations for video chunks following the new allocation. In some embodiments, the reduction of the allocated resources can be done based on the degree of the user's mobility—e.g., if the user has a low mobility the allocated resources can be reduced by 20%; if the user has a medium mobility the allocated resources can be reduced by 30%; if the user has a high mobility the allocated resources can be reduced by 50%.

In this example, if it is determined that the user is not in a mobility situation, then a determination is made regarding the power supply of the mobile computing device (block 712). If the power supply of the mobile computing device is weak (e.g., a low battery), it is determined whether the device has a small screen size (e.g., less than 4.5 inches diagonally) (block 714). If the power supply of the mobile computing device is weak and the device does have a small screen size, then the scheduler can allocate lesser resources (block 710).

If the power supply of the mobile computing device is weak and the device does not have a small screen size, then the scheduler can allocate videos of similar quality but with lesser battery requirements (e.g., videos having a lesser compression bitrate) (block 718). The network resources allocated to that user are reduced by the scheduler to match the resources needed by the new video. This in turn can result in a change for the network conditions for the user, and consequently can be reflected automatically in the client's player choice for the video presentations for video chunks after the new allocation of resources. In some embodiments, if no such video content exists, the scheduler can allocate bandwidth to the user sufficiently matching the requested video content to serve him quickly, allowing for lesser battery consumption.

If the power supply of the mobile computing device is not weak, it is determined whether the mobile computing device has a small screen size (e.g., less than 4.5 inches diagonally) (block 716). If the power supply of the mobile computing device is not weak and the mobile computing device does not have a small screen size, the scheduler can allocate bandwidth to the user sufficiently matching the requested video content (block 720). If the power supply of the mobile computing device is not weak but the mobile computing device has a small screen size, the scheduler can allocate lesser resources since perception quality differs with mobility (i.e., the user has a reduced perception capacity and is likely more tolerant of errors) (block 710). In other embodiments, the scheduler can allocate bandwidth to the user sufficiently matching the requested video content regardless of screen size if the user has no/low mobility and the power supply of the mobile computing device is not weak.

Thus, the video content received by the UE comprises a bit stream encoded based, at least in part, on the context information associated with the video content request. The bit stream of the video content received by the UE reflect Quality of Experience (QoE) parameters related to a quality of the received video content when displayed, the QoE parameters to include at least one of echo, jitter, and/or VMOS parameters.

Figure 8:
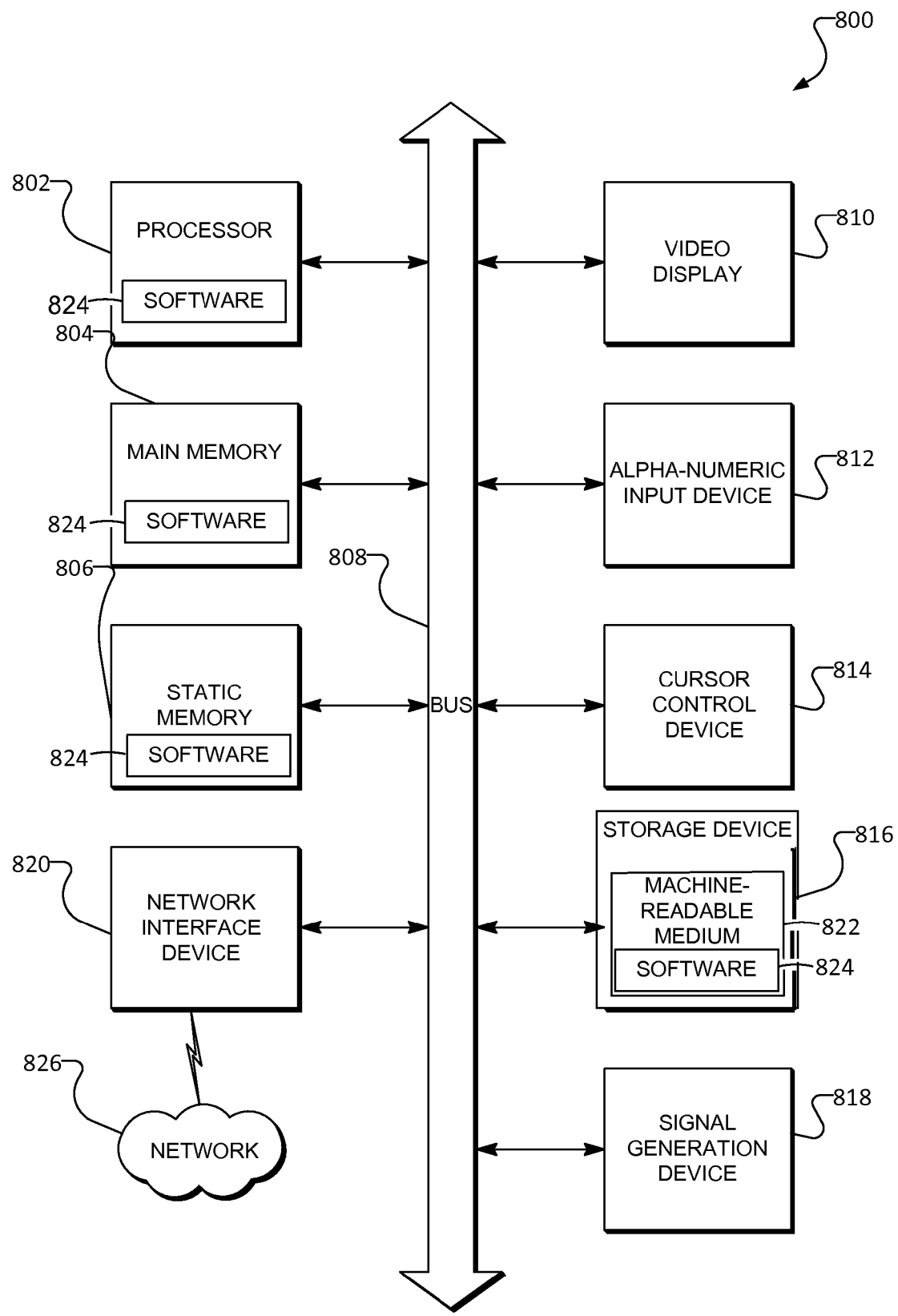
FIG. 8 is a block diagram illustrating components of a machine, according to some example embodiments, able to read instructions from a machine-readable medium and perform any one or more of the methodologies discussed herein, according to aspects of the disclosure.

FIG. 8 is a block diagram illustrating components of a machine, according to some example embodiments, able to read instructions from a machine-readable medium and perform any one or more of the methodologies discussed herein, according to aspects of the disclosure. In particular, FIG. 8 illustrates an exemplary computer system 800 within which software 824 for causing the machine to perform any one or more of the methodologies discussed herein can be executed. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 can further include a video display unit 810 (e.g., a liquid crystal display (LCD) or a cathode ray tube (CRT)). The computer system 800 also includes an alphanumeric input device 812 (e.g., a keyboard), a UI navigation (or cursor control) device 814 (e.g., a mouse), a storage device 816, a signal generation device 818 (e.g., a speaker) and a network interface device 820.

The storage device 816 includes a non-transitory machine-readable medium 822 on which is stored one or more sets of data structures and software 824 embodying or utilized by any one or more of the methodologies or functions described herein. The software 824 can also reside, completely or at least partially, within the main memory 804 and/or within the processor 802 during execution thereof by the computer system 800, the main memory 804 and the processor 802 also constituting non-transitory, machine-readable media. The software 824 can also reside, completely or at least partially, within the static memory 806.

While the non-transitory machine-readable medium 822 is shown in an example embodiment to be a single medium, the term "machine-readable medium" can include a single medium or multiple media (e.g., a centralized or distributed database, and/or associated caches and servers) that store the one or more software 824 or data structures. The term "machine-readable medium" shall also be taken to include any tangible medium that is capable of storing, encoding, or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The software 824 can further be transmitted or received over a communications network 826 using a transmission medium. The software 824 can be transmitted using the network interface device 820 and any one of a number of well-known transfer protocols (e.g., HTTP). Examples of communication networks include a LAN, a WAN, the internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

The drawings and the forgoing description gave examples of the present disclosure. Although depicted as a number of disparate functional items, those skilled in the art will appreciate that one or more of such elements can well be combined into single functional elements. Alternatively, certain elements can be split into multiple functional elements. Elements from one embodiment can be added to another embodiment. For example, orders of processes described herein can be changed and are not limited to the manner described herein. Moreover, the actions of any flow diagram need not be implemented in the order shown; nor do all of the acts necessarily need to be performed. Also, those acts that are not dependent on other acts can be performed in parallel with the other acts. The scope of the present disclosure, however, is by no means limited by these specific examples. Numerous variations, whether explicitly given in the specification or not, such as differences in structure, dimension, and use of material, are possible. The scope of the disclosure is at least as broad as given by the following claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

Embodiments describe a user equipment (UE) comprising an application layer to generate a video content request, and a physical layer (PHY) to transmit the video content request and context information associated with the video content request to a network node, and receive video content in response to the transmitted video content request, the received video content to comprise a bit stream encoded based, at least in part, on the context information associated with the video content request.

In some embodiments, the network node comprises an enhanced NodeB (eNodeB) included in a Universal Terrestrial Radio Access Network (UTRAN) of a Long Term Evolution (LTE)-based network. In some embodiments, the context information associated with the video content request comprises data traffic parameters defined by a wireless communication service account for a user of the UE.

In some embodiments, the context information associated with the video content request comprises hardware characteristics, including at least one of a display screen size of a display associated with the UE, a display screen resolution of the display, processor characteristics of a processor included in the PHY, and/or graphics processor unit (GPU) characteristics of a GPU included in the PHY.

In some embodiments, the context information associated with the video content request comprises activity tracking information indicating a mobility of the UE. In some embodiments, the context information associated with the video content request comprises application context information indicating a video content type of the video content request.

In some embodiments, the video content request comprises at least one of a hypertext transfer protocol (HTTP) live streaming (HLS) request, a HTTP dynamic streaming (HDS) request, and/or a motion picture experts group (MPEG) dynamic adaptive streaming over HTTP (MPEG-DASH) request.

In some embodiments, the bit stream of the received video content is encoded according to a video resolution selected based, at least in part, on the context information associated with the video content request. In some embodiments, the bit stream of the video content is encoded according to a bit compression rate selected based, at least in part, on the context information associated with the video content request. In some embodiments, the bit stream of the video content is to be displayed according to Quality of Experience (QoE) parameters related to a quality of the received video content, the QoE parameters to include at least one of echo, jitter, and/or video mean opinion score (VMOS) parameters.

In some embodiments, the UE further includes one or more antennas, and a display to display the received video content.

Embodiments describe an apparatus including an input/output (I/O) interface to receive a video content request and context information associated with the video content request from a mobile computing device, and transmit Quality of Service (QoS) parameters associated with the video content request. The apparatus further comprises a QoS logic to generate the QoS parameters based, at least in part, on the context information associated with the video content request, the QoS parameters to define at least one of a packet delay tolerance, a packet loss rate, and/or a bit rate associated with transmission of the video content request.

In some embodiments, the mobile computing device comprises a wireless handheld device connectable to a Long Term Evolution (LTE)-based network, and the I/O interface is to transmit the QoS parameters associated with the video content request to a policy and charging rules function (PCRF) included in an evolved packet core (EPC) of the LTE-based network.

In some embodiments, the mobile computing device comprises a wireless handheld device connectable to a Long Term Evolution (LTE)-based network, and the I/O interface is to transmit the QoS parameters associated with the video content request to a serving gateway (S-GW) included in an evolved packet core (EPC) of the LTE-based network. In some embodiments, the QoS parameters are transmitted to a video content server via the S-GW for the video content server to encode video for the video content request according to the QoS parameters.

In some embodiments, the mobile computing device comprises a wireless handheld device connectable to a Long Term Evolution (LTE)-based network, and the I/O interface is to transmit the QoS parameters associated with the video content request to an enhanced NodeB (eNodeB) included in a Universal Terrestrial Radio Access Network (UTRAN) of the LTE-based network.

In some embodiments, the mobile computing device comprises a wireless handheld device connectable to a Long Term Evolution (LTE)-based network, and the context information associated with the video content request comprises data traffic parameters defined by a wireless communication service account for a user of the mobile computing device.

In some embodiments, the QoS parameters are generated to include at least one of a jitter value associated with the video content request, a packet dropping probability associated with the video content request, a guaranteed bit rate (GBR) associated with the video content request, a maximum bit rate (MBR) associated with the video content request, and/or a bit error rate (BER) associated with the video content request.

In some embodiments, the context information associated with the video content request comprises mobile device hardware characteristics, including at least one of a display screen size of the mobile computing device, a display screen resolution of the display of the mobile computing device, processor characteristics of the mobile computing device, and/or graphics processor unit (GPU) characteristics of the mobile computing device.

In some embodiments, the context information associated with the video content request comprises at least one of activity tracking information indicating a mobility of the mobile computing device, or application context information indicating a video content type of the video content request.

In some embodiments, the mobile computing device video content request comprises at least one of a hypertext transfer protocol (HTTP) live streaming (HLS) request, a HTTP dynamic streaming (HDS) request, and/or a motion picture experts group (MPEG) dynamic adaptive streaming over HTTP (MPEG-DASH) request.

Embodiments described a non-transitory computer-readable storage medium whose contents, when executed by a computing system, cause the computing system to perform operations, comprising receiving a video content request and context information associated with the video content request from a mobile computing device, and generating Quality of Service (QoS) parameters associated with the video content request based, at least in part, on the context information associated with the video content request, the QoS parameters to define at least one of a packet delay tolerance, a packet loss rate, and/or a bit rate associated with transmission of the video content request.

In some embodiments, the context information associated with the video content request comprises mobile device hardware characteristics, including at least one of a display screen size of the mobile computing device, a display screen resolution of the display of the mobile computing device, processor characteristics of the mobile computing device, and/or graphics processor unit (GPU) characteristics of the mobile computing device.

Embodiments describe a method comprising receiving a video content request and context information associated with the video content request from a mobile computing device, and generating Quality of Service (QoS) parameters associated with the video content request based, at least in part, on the context information associated with the video content request, the QoS parameters to define at least one of a packet delay tolerance, a packet loss rate, and/or a bit rate associated with transmission of the video content request.

In some embodiments, the QoS parameters are generated to include at least one of a jitter value associated with the video content request, a packet dropping probability associated with the video content request, a guaranteed bit rate (GBR) associated with the video content request, a maximum bit rate (MBR) associated with the video content request, and/or a bit error rate (BER) associated with the video content request.

What is claimed is:

1. A user equipment (UE) comprising:
an application layer to generate a video content request; and
a physical layer (PHY) to:
transmit the video content request and context information associated with the video content request to a network node, the context information comprising hardware characteristics of the UE; and
receive video content in response to the transmitted video content request, the received video content to comprise a bit stream encoded based, at least in part, on the context information associated with the video content request,
wherein the video content request indicates video content of a particular quality; and
in response to an indication in the context information of a power supply below a predetermined power and a screen size below a predetermined size, the video content received is reduced bandwidth video content that has the particular quality but a lesser compression bitrate and bandwidth, and, if the reduced bandwidth video content is not available, the video content occupies a bandwidth matching a bandwidth of the video content in the video content request and higher than the bandwidth of the reduced bandwidth video content.

2. The UE of claim 1, wherein the network node comprises an enhanced NodeB (eNodeB) included in a Universal Terrestrial Radio Access Network (UTRAN) of a Long Term Evolution (LTE)-based network.

3. The UE of claim 2, wherein the context information associated with the video content request comprises data traffic parameters defined by a wireless communication service account for a user of the UE.

4. The UE of claim 1, wherein the hardware characteristics comprise at least one of a display screen size of a display associated with the UE, a display screen resolution of the display, processor characteristics of a processor included in the PHY, and/or graphics processor unit (GPU) characteristics of a GPU included in the PHY.

5. The UE of claim 1, wherein the context information associated with the video content request comprises activity tracking information indicating a mobility of the UE.

6. The UE of claim 1, wherein the context information associated with the video content request comprises application context information indicating a video content type of the video content request.

7. The UE of claim 1, wherein the video content request comprises at least one of a hypertext transfer protocol (HTTP) live streaming (HLS) request, a HTTP dynamic streaming (HDS) request, and/or a motion picture experts group (MPEG) dynamic adaptive streaming over HTTP (MPEG-DASH) request.

8. The UE of claim 1, wherein the bit stream of the received video content is encoded according to a video resolution selected based, at least in part, on the context information associated with the video content request.

9. The UE of claim 1, wherein the bit stream of the video content is encoded according to a bit compression rate selected based, at least in part, on the context information associated with the video content request.

10. The UE of claim 1, wherein the bit stream of the video content is to be displayed according to Quality of Experience (QoE) parameters related to a quality of the received video content, the QoE parameters to include at least one of echo, jitter, and/or video mean opinion score (VMOS) parameters.

11. The UE of claim 1, further comprising:
one or more antennas; and
a display to display the received video content.

12. An apparatus comprising:
an input/output (I/O) interface to:
receive a video content request and context information associated with the video content request from a mobile computing device, the context information comprising hardware characteristics of the mobile computing device; and
transmit Quality of Service (QoS) parameters associated with the video content request; and
QoS logic to generate the QoS parameters based, at least in part, on the context information associated with the video content request, the QoS parameters to define at least one of a packet delay tolerance, a packet loss rate, and/or a bit rate associated with transmission of the video content request,
wherein the video content request indicates video content of a particular quality, and
in response to an indication in the context information of a power supply below a predetermined power and a screen size below a predetermined size, the apparatus is further to determine whether a reduced bandwidth video content that has the particular quality but a lesser compression bitrate and bandwidth is available, and
in response to a determination that the reduced bandwidth video content is available, select the reduced bandwidth video content for transmission to the mobile computing device and reduce network resources allocated to the mobile computing device to match network resources used for the transmission of the reduced bandwidth video content, and
in response to a determination that the reduced bandwidth video content is unavailable, allocate video content comprising a bandwidth matching a bandwidth of the video content in the video content request and higher than the bandwidth of the reduced bandwidth video content.

13. The apparatus of claim 12, wherein the mobile computing device comprises a wireless handheld device configured to connect to a Long Term Evolution (LTE)-based network, and the I/O interface is to transmit the QoS parameters associated with the video content request to a policy and charging rules function (PCRF) included in an evolved packet core (EPC) of the LTE-based network.

14. The apparatus of claim 12, wherein the mobile computing device comprises a wireless handheld device configured to connect to a Long Term Evolution (LTE)-based network, and the I/O interface is to transmit the QoS parameters associated with the video content request to a serving gateway (S-GW) included in an evolved packet core (EPC) of the LTE-based network.

15. The apparatus of claim 14, wherein the QoS parameters are transmitted to a video content server via the S-GW for the video content server to encode video for the video content request according to the QoS parameters.

16. The apparatus of claim 12, wherein the mobile computing device comprises a wireless handheld device configured to connect to a Long Term Evolution (LTE)-based network, and the I/O interface is to transmit the QoS parameters associated with the video content request to an enhanced NodeB (eNodeB) included in a Universal Terrestrial Radio Access Network (UTRAN) of the LTE-based network.

17. The apparatus of claim 12, wherein the mobile computing device comprises a wireless handheld device configured to connect to a Long Term Evolution (LTE)-based network, and the context information associated with the video content request comprises data traffic parameters defined by a wireless communication service account for a user of the mobile computing device.

18. The apparatus of claim 12, wherein the QoS parameters are generated to include at least one of a jitter value associated with the video content request, a packet dropping probability associated with the video content request, a guaranteed bit rate (GBR) associated with the video content request, a maximum bit rate (MBR) associated with the video content request, and/or a bit error rate (BER) associated with the video content request.

19. The apparatus of claim 12, wherein the context information associated with the video content request comprises mobile device hardware characteristics, including at least one of a display screen size of the mobile computing device, a display screen resolution of the display of the mobile computing device, processor characteristics of the mobile computing device, and/or graphics processor unit (GPU) characteristics of the mobile computing device.

20. The apparatus of claim 12, wherein the context information associated with the video content request comprises at least one of:
activity tracking information indicating a mobility of the mobile computing device; or
application context information indicating a video content type of the video content request.

21. The apparatus of claim 12, wherein the mobile computing device video content request comprises at least one of a hypertext transfer protocol (HTTP) live streaming (HLS) request, a HTTP dynamic streaming (HDS) request, and/or a motion picture experts group (MPEG) dynamic adaptive streaming over HTTP (MPEG-DASH) request.

22. A non-transitory computer-readable storage medium whose contents, when executed by a computing system, cause the computing system to perform operations, comprising:
receiving a video content request and context information associated with the video content request from a mobile computing device, the context information comprising hardware characteristics of the mobile computing device, wherein the video content request indicates video content of a particular quality;
generating Quality of Service (QoS) parameters associated with the video content request based, at least in part, on the context information associated with the video content request, the QoS parameters to define at least one of a packet delay tolerance, a packet loss rate, and/or a bit rate associated with transmission of the video content request; and
in response to an indication in the context information of a power supply below a predetermined power and a screen size below a predetermined size, determining whether a reduced bandwidth video content that has the particular quality but a lesser compression bitrate and bandwidth is available, and;
in response to a determination that the reduced bandwidth video content is available, selecting the reduced bandwidth video content for transmission to the mobile computing device and reduce network resources allocated to the mobile computing device to match network resources used for the transmission of the reduced bandwidth video content, and in response to a determination that the reduced bandwidth video content is unavailable, allocating video content comprising a bandwidth matching a bandwidth of the video content in the video content request and higher than the bandwidth of the reduced bandwidth video content.

23. The non-transitory computer-readable storage medium of claim 22, wherein the mobile device hardware characteristics comprise at least one of a display screen size of the mobile computing device, a display screen resolution of the display of the mobile computing device, processor characteristics of the mobile computing device, and/or graphics processor unit (GPU) characteristics of the mobile computing device.

24. A method comprising:
receiving a video content request and context information associated with the video content request from a mobile computing device, the context information comprising hardware characteristics of the mobile computing device; and
generating Quality of Service (QoS) parameters associated with the video content request based, at least in part, on the context information associated with the video content request, the QoS parameters to define at least one of a packet delay tolerance, a packet loss rate, and/or a bit rate associated with transmission of the video content request; and
determining, in response to an indication in the context information of a power supply below a predetermined power and a screen size below a predetermined size, whether a reduced bandwidth video content that has the particular quality but a lesser compression bitrate and bandwidth is available, and;
selecting, in response to a determination that the reduced bandwidth video content is available, the reduced bandwidth video content for transmission to the mobile computing device and reduce network resources allocated to the mobile computing device to match network resources used for the transmission of the reduced bandwidth video content, and
allocating, in response to a determination that the reduced bandwidth video content is unavailable, video content comprising a bandwidth matching a bandwidth of the video content in the video content request and higher than the bandwidth of the reduced bandwidth video content.

25. The method of claim 24, wherein the QoS parameters are generated to include at least one of a jitter value associated with the video content request, a packet dropping probability associated with the video content request, a guaranteed bit rate (GBR) associated with the video content request, a maximum bit rate (MBR) associated with the video content request, and/or a bit error rate (BER) associated with the video content request.

26. The UE of claim 1, wherein the UE is further to:
automatically adjust a video player choice in response to reception of the reduced bandwidth video content.

27. The UE of claim 1, wherein:
the video content comprises an updated video streaming session that updates an initial video streaming session being received by the UE in a default mode that avoids use of the context information.

28. The apparatus of claim 12, wherein:
the context information comprises mobility of the mobile computing device, and
reduction of the network resources allocated based on a degree of the mobility, the reduction of the network resources increasing with increasing degree of the mobility.

29. The apparatus of claim 12, wherein:
an initial video streaming session is transmitted to the mobile computing device prior to reception of the context information, default QoS parameters used in transmission of the initial video streaming session, and
in response to reception of the video content request, an updated video streaming session is transmitted, the QoS parameters used in transmission of the updated video streaming session.

* * * * *